United States Patent
Dasaka (10) Patent No.: US 11,060,897 B2
(45) Date of Patent: Jul. 13, 2021

(54) FORCE COMPENSATION FOR A VIBRATING FLOWMETER AND RELATED METHOD

(71) Applicant: Micro Motion, Inc., Boulder, CO (US)

(72) Inventor: Brahmendra Sarma Dasaka, Pune (IN)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 16/617,723

(22) PCT Filed: Jun. 27, 2017

(86) PCT No.: PCT/US2017/039446
§ 371 (c)(1),
(2) Date: Nov. 27, 2019

(87) PCT Pub. No.: WO2019/005008
PCT Pub. Date: Jan. 3, 2019

(65) Prior Publication Data
US 2020/0109979 A1 Apr. 9, 2020

(51) Int. Cl.
*G01F 1/84* (2006.01)
*G01C 21/18* (2006.01)
(52) U.S. Cl.
CPC ........... *G01F 1/8413* (2013.01); *G01C 21/18* (2013.01)
(58) Field of Classification Search
None
See application file for complete search history.

(56) References Cited

U.S. PATENT DOCUMENTS

| 3,638,502 A * | 2/1972 | Leavitt | G01C 21/18 74/5.34 |
| 4,989,466 A | 2/1991 | Goodman | |
| 6,520,028 B1 * | 2/2003 | Van Cleve | G01F 1/8409 73/861.354 |
| 2008/0184813 A1 | 8/2008 | Patten et al. | |
| 2013/0086987 A1 * | 4/2013 | Lanham | G01D 11/00 73/662 |

FOREIGN PATENT DOCUMENTS

DE   102015122439 A1 *  6/2017  .........  G01F 25/0007

* cited by examiner

*Primary Examiner* — Harshad R Patel
(74) *Attorney, Agent, or Firm* — The Ollila Law Group LLC (57) ABSTRACT

A fluid measurement system (3) is provided having a Coriolis flowmeter (5) with a meter electronics (20) comprising a processing system (303) and a storage system (304). The Coriolis flowmeter (5) has a sensor assembly (10) comprising conduits (103A, 103B), wherein the sensor assembly (10) is in communication with meter electronics (20). The Coriolis flowmeter (5) has a plurality of pickoffs (105, 105') affixed to the conduits (103 A, 103B), that are in communication with the meter electronics (20). The Coriolis flowmeter (5) has a driver (104) affixed to the conduits (103A, 103B) that is in communication with the meter electronics (20). A gyroscopic sensor is in communication with the meter electronics (20). At least one actuator (406X, 406 Y, 406Z, 412) is coupled to the Coriolis flowmeter (5). The meter electronics (20) is configured to measure a fluid flow of a process fluid under acceleration through the sensor assembly (10).

17 Claims, 5 Drawing Sheets

FORCE COMPENSATION FOR A VIBRATING FLOWMETER AND RELATED METHOD

TECHNICAL FIELD

The present invention relates to flowmeters, and more particularly to a method and apparatus for determining accurate flow properties at acceleration.

BACKGROUND OF THE INVENTION

Vibrating sensors, such as for example, vibrating densitometers and Coriolis flowmeters are generally known, and are used to measure mass flow and other information for materials flowing through a conduit in the flowmeter. Exemplary Coriolis flowmeters are disclosed in U.S. Pat. Nos. 4,109,524, 4,491,025, and Re. 31,450, all to J. E. Smith et al. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

When there is no flow through the flowmeter, a driving force applied to the conduit(s) causes all points along the conduit(s) to oscillate with identical phase or a small "zero offset", which is a time delay measured at zero flow. As material begins to flow through the flowmeter, Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

Meter electronics connected to the driver generate a drive signal to operate the driver and determine a mass flow rate and other properties of a material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired flow tube amplitude and frequency. It is also known in the art to provide the pickoffs as a magnet and coil arrangement very similar to the driver arrangement. However, while the driver receives a current which induces a motion, the pickoffs can use the motion provided by the driver to induce a voltage. The magnitude of the time delay measured by the pickoffs is very small; often measured in nanoseconds. Therefore, it is necessary to have the transducer output be very accurate.

Generally, a Coriolis flowmeter can be initially calibrated and a flow calibration factor along with a zero offset can be generated. In use, the flow calibration factor (FCF) can be multiplied by the time delay measured by the pickoffs ($\Delta T$) minus the zero offset ($\Delta T_0$) to generate a mass flow rate.

Such mass flow calibrations may be represented by two calibration constants, which are equivalent to the slope (FCF) and intercept (zero offset) of a straight line. An example of a mass flow rate equation utilizing a flow calibration factor (FCF) and a zero offset ($\Delta T_0$) is described by Equation (1):

$$\dot{m} = FCF(\Delta T_{measured} - \Delta T_0) \qquad (1)$$

Where:
$\dot{m}$ = mass flow rate
FCF = flow calibration factor
$\Delta T_{measured}$ = measured time delay
$\Delta T_0$ = initial zero offset Coriolis mass flowmeters are generally used at or near the earth's surface. For measurements in high force applications, mass flow is typically measured using turbine flow meters. Turbine flowmeters lack the requisite accuracy required for the aerospace industry, however.

For example, the volume of a gallon of fuel will change significantly over certain temperature ranges, but the mass remains the same. The addition or removal of weight on an aircraft affects many performance variables such as takeoff speed, required runway length, cruise altitude, cruise range, optimum cruise speed, landing speed, and landing length required. Full fuel can take up as much as 40% of an aircraft's total weight, which greatly affects flight performance. A standard 747-200 aircraft, for example, has 7 fuel tanks and a fuel capacity of 193,000 liters. At standard density, typical jet fuel weighs about 813 grams per liter. At such conditions, the tanks may be filled such that 156,800 Kg of fuel are onboard. However, if the fuel is hot, such as may be the case in a tropical climate, the aircraft may only receive roughly 149,000 Kg of fuel. Likewise, in a cold climate, such as during an Alaskan winter, the tank may accept 162,000 Kg of fuel. The difference in fuel mass between the hot and cold extremes is approximately 13,000 Kg, which equates to a difference of 1 hour of flight time— or close to 885 Km of range.

A typical turbine flow meter used in jet engine applications, for example, has an accuracy of around 0.5% to 1%. In some cases, this can amount to an inaccuracy of roughly 900 liters of fuel for a given flight. Besides paying for extra fuel (or conversely not having enough fuel onboard), a rich fuel mixture that results in uncombusted fuel leads to atmospheric pollution and increased environmental impact. Furthermore, the measurement error under inertial forces of 5-10 g, which are typical during flight, can increase error rate by approximately 3%, thus potentially increasing the error already inherent in a turbine flow meter by up to 6-fold. To mitigate such errors, it is common practice to use flow conditioners before the turbine meters and use two or even three flow meters in series. This, of course, adds extra cost, weight, and complexity to the system.

As a Coriolis flow meter has an accuracy of about 0.05%, using such a meter in an aeronautic setting would improve accuracy and overall flight economics due to reduced fuel-related losses. Furthermore, several factors, such as fuel temperature, the velocity profile of the fuel, bearing friction, viscous drag, fluid density, rotor stability, noise and vibration are far less prone to interfering with system accuracy when using a Coriolis flowmeter as compared to a turbine flow meter.

Therefore, there is a need in the art for an apparatus and method to accurately measure process fluid flow under high-force conditions. The present invention overcomes the above-noted difficulties and other problems and an advance in the art is achieved. To overcome these difficulties, a Coriolis mass flow meter designed for dynamic applications and related methods are provided. In particular, a flowmeter that compensates and withstands the dynamic loads typical in vehicular and aeronautic applications is presented. The need for flowmeter redundancy and in-line conditioning are eliminated, and system accuracy is improved.

SUMMARY OF THE INVENTION

According to an embodiment, a fluid measurement system is provided. The fluid measurement system comprises a Coriolis flowmeter comprising a meter electronics further comprising a processing system and a storage system. A sensor assembly comprises conduits, wherein the sensor assembly is in communication with meter electronics. A plurality of pickoffs are affixed to the conduits, wherein the plurality of pickoffs is in communication with the meter electronic. A driver is affixed to the conduits, wherein the driver is in communication with the meter electronics. A gyroscopic sensor is in communication with the meter electronics. At least one actuator is coupled to the Coriolis flowmeter. The meter electronics is configured to measure a fluid flow of a process fluid under acceleration through the sensor assembly.

According to an embodiment, a method of stabilizing a flowmeter is provided. The method comprises the steps of: determining a preferred orientation of a sensor assembly; determining the actual orientation of the sensor assembly; determining a difference between the actual orientation and the preferred orientation; and changing the actual orientation of the sensor assembly by approximately the difference between the actual orientation and the preferred orientation.

According to an embodiment, a method of stabilizing a flowmeter is provided. The method comprises the steps of: coupling a sensor assembly to a platform, wherein the platform is pivotable about an x, y, and z axis; coupling at least one gyroscopic gimbal to the platform, wherein the at least one gyroscopic gimbal aids in stabilizing the platform.

According to an embodiment, a fluid measurement system is provided. The fluid measurement system comprises a Coriolis flowmeter comprising a meter electronics further comprising a processing system and a storage system. A sensor assembly comprises conduits, wherein the sensor assembly is in communication with meter electronics. A plurality of pickoffs are affixed to the conduits, wherein the plurality of pickoffs is in communication with the meter electronics. A driver is affixed to the conduits, wherein the driver is in communication with the meter electronics. At least one gyroscopic gimbal is coupled to the Coriolis flowmeter. A joint allows Coriolis flowmeter motion in the x, y, and z axes. The meter electronics is configured to measure a fluid flow of a process fluid under acceleration through the sensor assembly.

Aspects

According to an aspect, a fluid measurement system comprises a Coriolis flowmeter comprising: a meter electronics comprising a processing system and a storage system; a sensor assembly comprising conduits, wherein the sensor assembly is in communication with meter electronics; a plurality of pickoffs affixed to the conduits, wherein the plurality of pickoffs is in communication with the meter electronics; and a driver affixed to the conduits, wherein the driver is in communication with the meter electronics. A gyroscopic sensor is in communication with the meter electronics. At least one actuator is coupled to the Coriolis flowmeter. The meter electronics is configured to measure a fluid flow of a process fluid under acceleration through the sensor assembly.

Preferably, the at least one actuator is coupled to the Coriolis flowmeter with a platform.

Preferably, the at least one actuator comprises: a first actuator coupled to the platform, and configured to move the platform about an x axis; a second actuator coupled to the platform, and configured to move the platform about a y axis; and a third actuator coupled to the platform, and configured to move the platform about a z axis.

Preferably, the first, second, and third actuators are in communication with meter electronics.

Preferably, the first, second, and third actuators comprise rotary actuators.

Preferably, the first, second, and third actuators comprise linear actuators.

Preferably, the fluid measurement system further comprises a flexible junction between the flowmeter and a process line.

According to an aspect, a method of stabilizing a flowmeter comprises the steps of: determining a preferred orientation of a sensor assembly; determining the actual orientation of the sensor assembly; determining a difference between the actual orientation and the preferred orientation; and changing the actual orientation of the sensor assembly by approximately the difference between the actual orientation and the preferred orientation.

Preferably, the actual orientation is determined with a gyroscopic sensor.

Preferably, the actual orientation is changed with at least one actuator.

Preferably, the method of stabilizing a flowmeter comprises the step of coupling the sensor assembly to a platform.

Preferably, the method of stabilizing a flowmeter comprises the step of coupling at least one actuator to the platform.

Preferably, the method of stabilizing a flowmeter comprises providing meter electronics in communication with the sensor assembly; connecting meter electronics to a gyroscopic sensor; and connecting meter electronics to at least one actuator.

Preferably, the method of stabilizing a flowmeter comprises connecting the sensor assembly to a process line with a flexible junction.

According to an aspect, a method of stabilizing a flowmeter, comprising the steps of: coupling a sensor assembly to a platform, wherein the platform is pivotable about an x, y, and z axis, and coupling at least one gyroscopic gimbal to the platform, wherein the at least one gyroscopic gimbal aids in stabilizing the platform.

Preferably, the at least one gyroscopic gimbal comprises three gimbals.

Preferably, each gimbal is spaced 120° from a neighboring gimbal.

According to an aspect, a fluid measurement system, comprising: a Coriolis flowmeter comprising: a meter electronics comprising a processing system and a storage system; a sensor assembly comprising conduits, wherein the sensor assembly is in communication with meter electronics; a plurality of pickoffs affixed to the conduits, wherein the plurality of pickoffs is in communication with the meter electronics; and a driver affixed to the conduits, wherein the driver is in communication with the meter electronics. At least one gyroscopic gimbal is coupled to the Coriolis flowmeter. A joint allows Coriolis flowmeter motion in the x, y, and z axes. The meter electronics is configured to measure a fluid flow of a process fluid under acceleration through the sensor assembly.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention, and will appreciate that the features described below can be combined in various ways to form multiple variations of the invention. As a result, the invention is not limited to the specific examples described below, but only by the claims and their equivalents.

Figure 1:
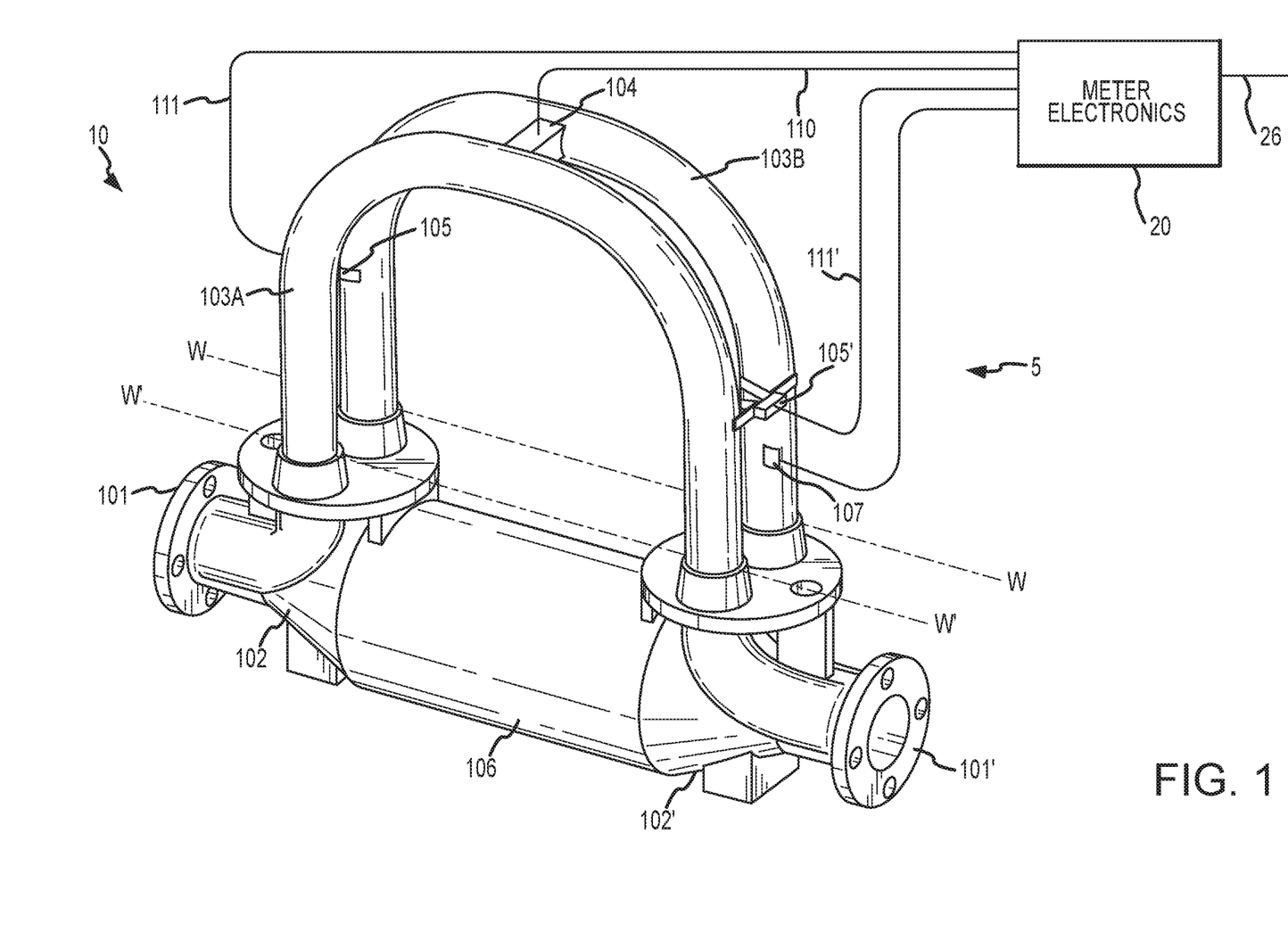
FIG. 1 shows a vibrating sensor assembly according to an embodiment.

FIG. 1 illustrates an example of a flowmeter 5 in the form of a Coriolis flowmeter comprising a sensor assembly 10 and one or more meter electronics 20. The one or more meter electronics 20 are connected to sensor assembly 10 to measure a characteristic of a flowing material, such as, for example, density, pressure, mass flow rate, volume flow rate, totalized mass flow, temperature, and other information.

The sensor assembly 10 includes a pair of flanges 101 and 101', manifolds 102 and 102', and conduits 103A and 103B. Manifolds 102, 102' are affixed to opposing ends of the conduits 103A, 103B. Flanges 101 and 101' of the present example are affixed to manifolds 102 and 102'. Manifolds 102 and 102' of the present example are affixed to opposite ends of spacer 106. The spacer 106 maintains the spacing between manifolds 102 and 102' in the present example to prevent undesired vibrations in conduits 103A and 103B. The conduits 103A and 103B extend outwardly from the manifolds 102 and 102' in an essentially parallel fashion. When the sensor assembly 10 is inserted into a pipeline system (not shown) which carries the flowing material, the material enters sensor assembly 10 through flange 101, passes through inlet manifold 102 where the total amount of material is directed to enter conduits 103A and 103B, flows through conduits 103A and 103B, and back into outlet manifold 102' where it exits the sensor assembly 10 through the flange 101'.

The sensor assembly 10 includes a driver 104. The driver 104 is affixed to conduits 103A and 103B in a position where the driver 104 can vibrate the conduits 103A, 103B in the drive mode. More particularly, the driver 104 includes a first driver component (not shown) affixed to conduit 103A, and a second driver component (not shown) affixed to conduit 103B. The driver 104 may comprise one of many well-known arrangements, such as a magnet mounted to the conduit 103A and an opposing coil mounted to the conduit 103B.

In the present example, the drive mode is the first out of phase bending mode, and the conduits 103A and 103B are preferably selected and appropriately mounted to inlet manifold 102 and outlet manifold 102' so as to provide a balanced system having substantially the same mass distribution, moments of inertia, and elastic moduli about bending axes W-W and W'-W', respectively. In the present example, where the drive mode is the first out of phase bending mode, the conduits 103A and 103B are driven by the driver 104 in opposite directions about their respective bending axes W-W and W'-W'. A drive signal in the form of an alternating current can be provided by one or more meter electronics 20, such as for example via lead 110, and passed through the coil to cause both conduits 103A, 103B to oscillate. Those of ordinary skill in the art will appreciate that other driver types and drive modes may be used within the scope of the present invention.

The sensor assembly 10 shown includes a pair of pickoffs 105, 105' that are affixed to conduits 103A, 103B. More particularly, a first pickoff component (not shown) is located on conduit 103A, and a second pickoff component (not shown) is located on conduit 103B. In the embodiment depicted, the pickoffs 105, 105' may be electromagnetic detectors, for example—pickoff magnets and pickoff coils that produce pickoff signals that represent the velocity and position of the conduits 103A, 103B. For example, the pickoffs 105, 105' may supply pickoff signals to the one or more meter electronics via pathways 111, 111'. Those of ordinary skill in the art will appreciate that the motion of the conduits 103A, 103B is proportional to certain characteristics of the flowing material, for example, the mass flow rate and density of the material flowing through the conduits 103A, 103B.

It should be appreciated that while the sensor assembly 10 described above comprises a dual flow conduit flowmeter, it is well within the scope of the present invention to implement a single conduit flowmeter. Furthermore, while the flow conduits 103A, 103B are shown as comprising a curved flow conduit configuration, the present invention may be implemented with a flowmeter comprising a straight flow conduit configuration. Therefore, the particular embodiment of the sensor assembly 10 described above is merely one example and should in no way limit the scope of the present invention.

In the example shown in FIG. 1, the one or more meter electronics 20 receive the pickoff signals from the pickoffs 105, 105'. Path 26 provides an input and an output means that allows one or more meter electronics 20 to interface with an operator. The one or more meter electronics 20 measure a characteristic of a flowing material, such as, for example, a phase difference, a frequency, a time delay, a density, a mass flow rate, a volume flow rate, a totalized mass flow, a temperature, a meter verification, pressure, and other information. More particularly, the one or more meter electronics 20 receive one or more signals, for example, from pickoffs 105, 105', and one or more temperature sensors 107, such as a resistive temperature detector (RTD), and use this information to measure a characteristic of a flowing material.

The techniques by which vibrating sensor assemblies, such as, for example, Coriolis flowmeters or densitometers, measure a characteristic of a flowing material are well understood; therefore, a more detailed discussion is omitted for brevity of this description.

Figure 2:
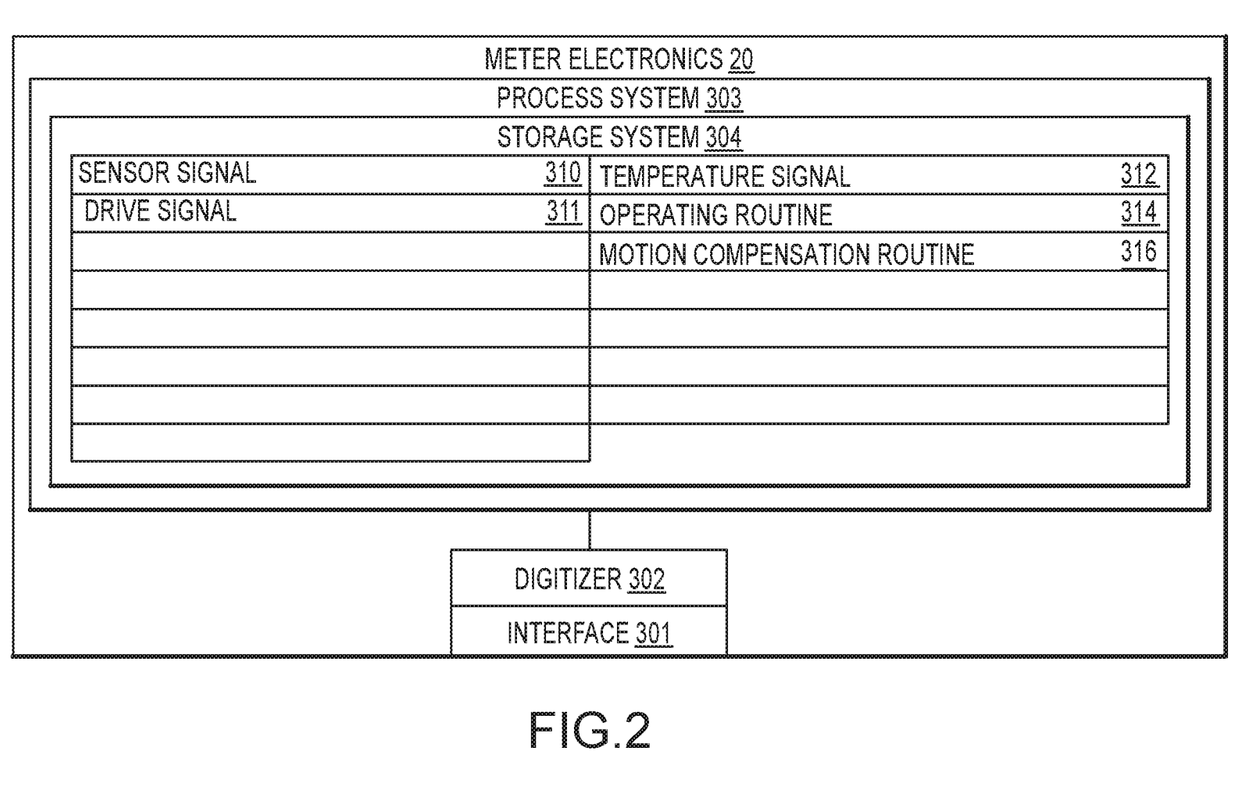
FIG. 2 shows meter electronics according to an embodiment.

FIG. 2 shows the meter electronics 20 according to an embodiment. The meter electronics 20 can include an interface 301 and a processing system 303. The processing system 303 may include a storage system 304. The storage system 304 may comprise an internal memory and/or may comprise an external memory. The meter electronics 20 can generate a drive signal 311 and supply the drive signal 311 to the driver 104. In addition, the meter electronics 20 can receive sensor signals 310 from the pickoffs 105, 105', such as pickoff/velocity sensor signals, strain signals, optical signals, or any other signals or sensors known in the art. In some embodiments, the sensor signals 310 can be received from the driver 104. The meter electronics 20 can operate as a densitometer or can operate as a mass flowmeter, including operating as a Coriolis flowmeter. It should be appreciated that the meter electronics 20 may also operate as some other type of vibrating sensor assembly and the particular examples provided should not limit the scope of the present invention. The meter electronics 20 can process the sensor signals 310 in order to obtain flow characteristics of the material flowing through the flow conduits 103A, 103B. In some embodiments, the meter electronics 20 may receive a temperature signal 312 from one or more resistive temperature detector (RTD) sensors or other temperature sensors 107, for example.

The interface 301 can receive the sensor signals 310 from the driver 104 or pickoffs 105, 105', via leads 110, 111, 111'. The interface 301 may perform any necessary or desired signal conditioning, such as any manner of formatting, amplification, buffering, etc. Alternatively, some or all of the signal conditioning can be performed in the processing system 303. In addition, the interface 301 can enable communications between the meter electronics 20 and external devices. The interface 301 can be capable of any manner of electronic, optical, or wireless communication.

The interface 301 in one embodiment can include a digitizer 302, wherein the sensor signal comprises an analog sensor signal. The digitizer 302 can sample and digitize the analog sensor signal and produce a digital sensor signal. The digitizer 302 can also perform any needed decimation, wherein the digital sensor signal is decimated in order to reduce the amount of signal processing needed and to reduce the processing time.

The processing system 303 can conduct operations of the meter electronics 20 and process flow measurements from the sensor assembly 10. The processing system 303 can execute one or more processing routines, such as a general operating routine 314.

The processing system 303 can comprise a general purpose computer, a micro-processing system, a logic circuit, or some other general purpose or customized processing device. The processing system 303 can be distributed among multiple processing devices. The processing system 303 can include any manner of integral or independent electronic storage medium, such as storage system 304.

The processing system 303 processes the sensor signals 310 in order to generate a drive signal 311, among other things. The drive signal 311 is supplied to the driver 104 via lead 110 in order to vibrate the associated flow tube(s), such as the conduits 103A, 103B of FIG. 1.

A motion compensation routine 316 communicates with and processes data received from at least one gyroscopic sensor 404. Meter electronics may calibrate, update, and send and receive data to and from the gyroscopic sensor 404. Positional signals and motion signals from the gyroscopic sensor 404 may be processed via the motion compensation routine 316 to generate corresponding signals for actuators 406X, 406Y, 406Z, and 412, such that compensatory motion and position may be obtained, as will be described in greater detail below. Furthermore, positional signals and motion signals from the gyroscopic sensor 404 may be processed via the motion compensation routine 316 to adjust mass flow rate, density, volume flow rate, and other measured values, to mathematically compensate measured Coriolis bending forces so to reduce or eliminate the effect of external inertial forces on the bending modes that are measured in response to process fluid flow through the flowmeter 5. In an embodiment, the preferred or starting orientation of the flowmeter is predetermined, and this position is saved in meter electronics. In an embodiment, the gyroscopic sensor 404 determines the actual orientation of the flowmeter 5, and a difference between the actual orientation and the preferred orientation is calculated. This difference is calculated by meter electronics or by external electronics, and the actual orientation of the flowmeter may be altered by approximately the difference between the actual orientation and the preferred orientation. This may be effectuated by actuators, as will be discussed below. This compensates for motion, and places the flowmeter 5 in approximately the preferred orientation. Besides position, the rate of position change may be calculated, and the flowmeter 5 may be moved at a rate that at least partially counteracts the forces that accompany a positional change. The rate and positional changes may be calculated with meter electronics 20 or external electronics.

It should be understood that the meter electronics 20 may include various other components and functions that are generally known in the art. These additional features are omitted from the description and the figures for the purpose of brevity. Therefore, the present invention should not be limited to the specific embodiments shown and discussed.

Figure 3:
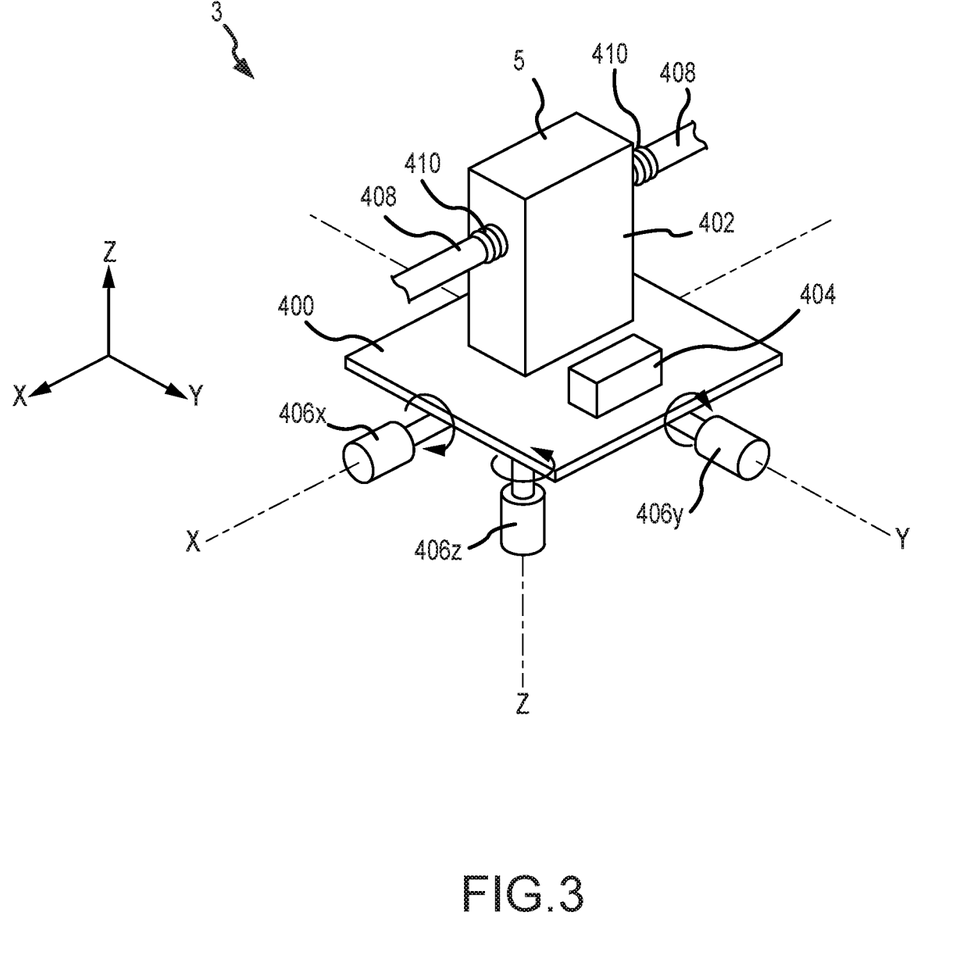
FIG. 3 illustrates a flowmeter according to an embodiment.
Figure 4:
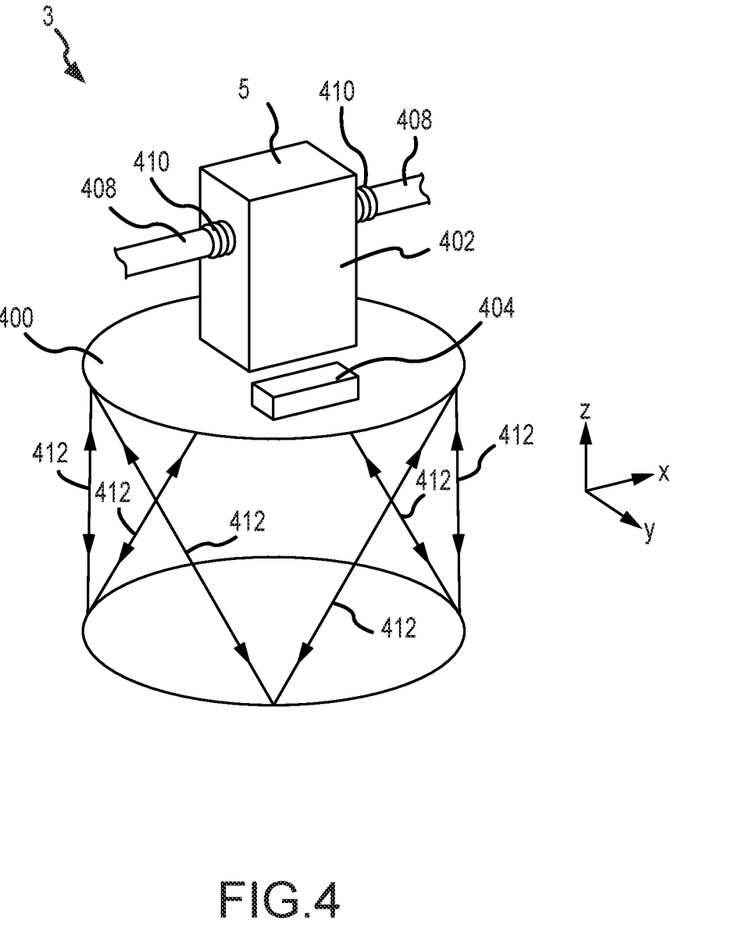
FIG. 4 illustrates a flowmeter according to an alternate embodiment.
Figure 5:
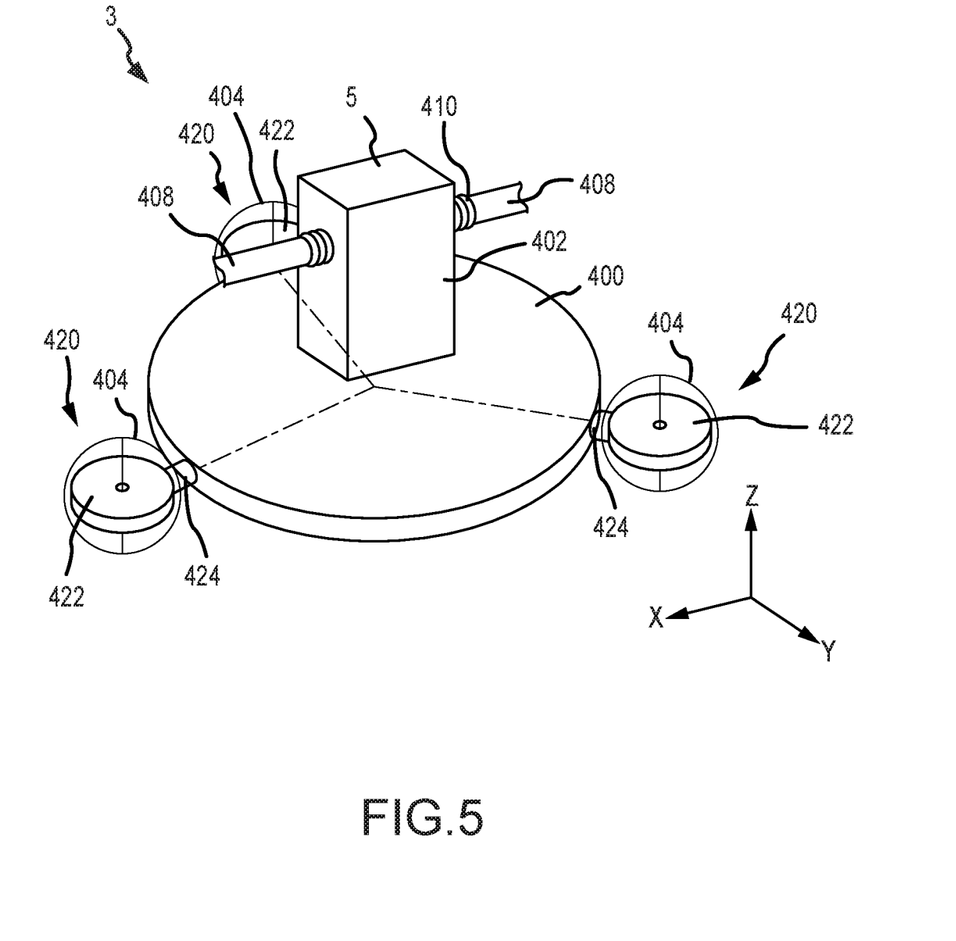
FIG. 5 illustrates a flowmeter according to yet another embodiment.

Turning to FIGS. 3-5, embodiments of fluid measurement systems 3 having flowmeters 5 are provided that are suitable for high-force applications, such as in vehicular or aeronautic applications, for example without limitation. In the embodiments, the Coriolis flow meters measure flow tube motion from the pick offs 105, 105', which are attached to the flow tubes 103A, 103B, which are thus on an independent frame of reference from the case, mounting points, or even the earth. Of course, flow tube motion may be measured from a stationary frame of reference, but in embodiments provided, flow tube 103A, 103B displacement is measured from a flow tube-to-flow tube manner, such that when mounted on an aircraft, for example without limitation, Coriolis motion is measurable.

With particular reference to FIG. 3, a Coriolis flowmeter 5 is mounted on a platform 400. A case 402 may be provided to enclose the sensor assembly 10 (not visible due to case). The platform 400 comprises a gyroscopic sensor 404, which may detect the position and/or acceleration of the platform 400 in three (x, y, z) axes. It should be noted that the platform 400 may be a base upon which the flowmeter 5 is mounted, or may comprise a case, manifold, standoffs, or any other portion of the flowmeter 5, thus obviating the need for a separate mounting stage. The gyroscopic sensor 404 is in communication with meter electronics 20. An actuator 406X, 406Y, 406Z is coupled to the platform 400, such that the actuator 406X may move the platform 400 in the x plane, the actuator 406Y may move the platform 400 in the y plane, and the actuator 406Z may move the platform 400 in the z plane. The actuators 406X, 406Y, 406Z are in communication with meter electronics 20. In an embodiment, the gyroscopic sensor 404 detects a change in spatial position of the platform 400, and a signal is generated that is sent to meter electronics 20. In response, a desired compensatory motion path that cancels, or at least attenuates, the measured change in spatial position of the platform 400 is calculated.

A signal is sent from meter electronics 20 to the actuators 406X, 406Y, 406Z such that the motion and position of the platform 400 may be adjusted so to compensate for the non-inertial frame-related spatial position or rate of position change of the platform 400. Furthermore, inertial changes detected by the gyroscopic sensor 404 may be utilized to mathematically compensate measured Coriolis bending forces to reduce or eliminate the effect of external inertial forces on the bending modes that are measured in response to process fluid flow through the flowmeter 5. For example, the extra dynamic loads coming from speeding up or slowing down of a vehicle can be detected and compensated for using this embodiment.

In order to reduce the effects of external inertial interference, in an embodiment, the driver 104 and pickoffs 105, 105' may be replaced with MEMS-based sensors in order to reduce mass and therefore to reduce the dynamic stresses on the tubes while measuring during motion.

Although each of the actuators 406X, 406Y, 406Z is illustrated as being disposed in-line with a central axis of the platform 400 (or the center of the flowmeter 5), in an embodiment, one of the actuators may be located at the edge of the platform 400, aligned parallel with the axis defined by said edge. In such an embodiment, the actuator is coupled to the platform 400, such that rotational motion of the actuator is coupled directly to the platform, and rotational motion is conferred directly thereto.

It should be noted that the process line 408 is connected to the flowmeter 5 using a flexible junction 410. The flexible junction 410 allows the flowmeter 5 to have a predetermined range of motion that is not constrained by anchoring to a rigid conduit.

The actuators 406X, 406Y, 406Z illustrated in FIG. 3 are rotary in nature, and confer a rotational motion through an axis of the platform 400. FIG. 4 illustrates an embodiment of the invention wherein linear actuators 412 are coupled to the platform 400. In the same vein as the embodiment shown in FIG. 3, the linear actuators 412 may move the platform 400 in the x plane, the y plane, and the z plane. The platform 400 comprises a gyroscopic sensor 404, which may detect the position and/or acceleration of the platform 400 in three (x, y, z) axes. The gyroscopic sensor 404 is in communication with meter electronics 20. The linear actuators 412 are in communication with meter electronics 20. In an embodiment, the gyroscopic sensor 404 detects a change in spatial position of the platform 400, and a signal is generated that is sent to meter electronics 20. In response, a desired compensatory motion path that cancels, or at least attenuates, the measured change in spatial position of the platform 400 is calculated. A signal is sent from meter electronics 20 to the linear actuators 412 such that the motion and position of the platform 400 may be adjusted by either extension or contraction of an actuator so to compensate for the non-inertial frame-related spatial position or rate of position change of the platform 400. Like other embodiments, inertial changes detected by the gyroscopic sensor 404 may be utilized to mathematically compensate measured Coriolis bending forces to reduce or eliminate the effect of external inertial forces on the bending modes that are measured in response to process fluid flow through the flowmeter 5.

The embodiments illustrated in FIGS. 3 and 4 show active compensation schemes for dealing with externally applied inertial forces. FIG. 5 illustrates a relatively passive approach. In this, and related embodiments, the Coriolis flowmeter 5 is still mounted on a platform 400, and the platform 400 may comprise a gyroscopic sensor 404 that may detect the position and/or acceleration of the platform 400 in three (x, y, z) axes. For this embodiment, however, a gyroscopic sensor is not required. It should be noted that for all embodiments, the position of the gyroscopic sensor may be such that it is not strictly mounted on the platform 400 itself, but may be on the flowmeter 5, case 402, standoffs, or other appropriate location. A gyroscopic sensor 404 may be in communication with meter electronics 20, and inertial changes detected by the gyroscopic sensor 404 may be utilized to mathematically compensate measured Coriolis bending forces to reduce or eliminate the effect of external inertial forces on the bending modes that are measured in response to process fluid flow through the flowmeter 5. A gyroscopic gimbal 420 is coupled to the platform 400. In the embodiment illustrated, three gimbals 420 are coupled to the platform 400, and are spaced approximately 120° from each other. The gimbals 420 each comprise a spinning wheel 422 or disc in which the axis of rotation is free to assume any orientation. When rotating, the orientation of this axis of the spinning wheel 422 is unaffected by tilting or rotation of the mounting 424, due to the well-known property of conservation of angular momentum. This property aids in maintaining the orientation of the gimbal 420. The center of the platform 400 may be mounted on a joint that allows motion in the x, y, and z axis. Alternatively, in instances without a mounting state, the platform may comprise a case, manifold, standoffs, or any other portion of the flowmeter 5, thus obviating the need for a separate mounting stage. Therefore, case, manifold, standoffs, or any other portion of the flowmeter 5 may be mounted on a joint that allows motion in the x, y, and z axis. When mounted on substrate that experiences motion, such as a plane, for example without limitation, as the substrate experiences acceleration or changes roll, pitch, and/or yaw, the platform 400 tends to self-stabilize due to the gimbals 420. Therefore, inertial changes of the substrate are automatically compensated for, and Coriolis bending forces being measured by the flowmeter 5 are not affected by external inertial forces. Therefore, accurate readings of the bending modes that are measured in response to process fluid flow through the flowmeter 5 may be made.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

I claim:
1. A fluid measurement system (3), comprising:
   a Coriolis flowmeter (5) comprising:
      a meter electronics (20) comprising a processing system (303) and a storage system (304);
      a sensor assembly (10) comprising conduits (103A, 103B), wherein the sensor assembly (10) is in communication with meter electronics (20);
      a plurality of pickoffs (105, 105') affixed to the conduits (103A, 103B), wherein the plurality of pickoffs (105, 105') is in communication with the meter electronics (20); and a driver (104) affixed to the conduits (103A, 103B), wherein the driver (104) is in communication with the meter electronics (20);
a non-pickoff gyroscopic sensor in communication with the meter electronics (20);
at least one actuator (406X, 406Y, 406Z, 412) in communication with meter electronics, and coupled to the Coriolis flowmeter (5); and
wherein the meter electronics (20) is configured to measure a fluid flow of a process fluid under acceleration through the sensor assembly (10).

2. The fluid measurement system (3) of claim 1, wherein the at least one actuator (406X, 406Y, 406Z, 412) is coupled to the Coriolis flowmeter with a platform (400).

3. The fluid measurement system (3) of claim 1, wherein the at least one actuator (406X, 406Y, 406Z, 412) comprises:
a first actuator (406X, 412) coupled to the platform (400), and configured to move the platform (400) about an x axis;
a second actuator (406Y, 412) coupled to the platform (400), and configured to move the platform (400) about a y axis; and
a third actuator (406Z, 412) coupled to the platform (400), and configured to move the platform (400) about a z axis.

4. The fluid measurement system (3) of claim 3, wherein the first, second, and third actuators (406X, 406Y, 406Z, 412) are in communication with meter electronics (20).

5. The fluid measurement system (3) of claim 3, wherein the first, second, and third actuators (406X, 406Y, 406Z) comprise rotary actuators.

6. The fluid measurement system (3) of claim 3, wherein the first, second, and third actuators (412) comprise linear actuators.

7. The fluid measurement system (3) of claim 1, further comprising a flexible junction (410) between the flowmeter (5) and a process line (408).

8. A method of stabilizing a Coriolis flowmeter comprising a sensor assembly, comprising the steps of:
determining a preferred orientation of the sensor assembly, and storing the preferred orientation position in a meter electronics of the Coriolis flowmeter;
determining the actual orientation of the sensor assembly, with a non-pickoff gyroscopic sensor;
determining a difference between the actual orientation and the preferred orientation; and
changing the actual orientation of the sensor assembly by approximately the difference between the actual orientation and the preferred orientation.

9. The method of stabilizing a flowmeter of claim 8, wherein the actual orientation is changed with at least one actuator.

10. The method of stabilizing a flowmeter of claim 8, comprising the step of coupling the sensor assembly to a platform.

11. The method of stabilizing a flowmeter of claim 10, comprising the step of coupling at least one actuator to the platform.

12. The method of stabilizing a flowmeter of claim 8, comprising the steps of:
providing meter electronics in communication with the sensor assembly;
connecting meter electronics to a gyroscopic sensor; and
connecting meter electronics to at least one actuator.

13. The method of stabilizing a flowmeter of claim 8, comprising the steps of connecting the sensor assembly to a process line with a flexible junction.

14. A method of stabilizing a Coriolis flowmeter comprising a sensor assembly, comprising the steps of:
coupling a sensor assembly to a platform, wherein the platform is pivotable about an x, y, and z axis; and
coupling at least one gyroscopic gimbal to the platform, wherein the at least one gyroscopic gimbal aids in stabilizing the platform.

15. The method of stabilizing a flowmeter of claim 14, wherein the at least one gyroscopic gimbal comprises three gimbals.

16. The method of stabilizing a flowmeter of claim 15, wherein each gimbal is spaced 120° from a neighboring gimbal.

17. A fluid measurement system (3), comprising:
a Coriolis flowmeter (5) comprising:
a meter electronics (20) comprising a processing system (303) and a storage system (304);
a sensor assembly (10) comprising conduits (103A, 103B), wherein the sensor assembly (10) is in communication with meter electronics (20), wherein the sensor assembly (10) is connected to a process line with a flexible junction;
a plurality of pickoffs (105, 105') affixed to the conduits (103A, 103B), wherein the plurality of pickoffs (105, 105') is in communication with the meter electronics (20); and
a driver (104) affixed to the conduits (103A, 103B), wherein the driver (104) is in communication with the meter electronics (20);
at least one gyroscopic gimbal (420) coupled to the Coriolis flowmeter (5);
a joint that allows Coriolis flowmeter (5) motion in the x, y, and z axes; and
wherein the meter electronics (20) is configured to measure a fluid flow of a process fluid under acceleration through the sensor assembly (10).

* * * * *